United States Patent
Beaman et al.

(12)

(10) Patent No.: US 7,487,381 B1
(45) Date of Patent: Feb. 3, 2009

(54) TECHNIQUE FOR VERIFYING A CONFIGURATION OF A STORAGE ENVIRONMENT

(75) Inventors: Rebecca Beaman, Reading, MA (US); James R. Grier, Groton, MA (US)

(73) Assignee: Network Appliance, Inc., Sunnyvale, CA (US)

( * ) Notice: Subject to any disclaimer, the term of this patent is extended or adjusted under 35 U.S.C. 154(b) by 433 days.

(21) Appl. No.: 10/753,707

(22) Filed: Jan. 8, 2004

(51) Int. Cl.
*G06F 11/00* (2006.01)

(52) U.S. Cl. .......................... 714/4; 709/220; 709/223
(58) Field of Classification Search ................. 714/57, 714/46
See application file for complete search history.

(56) References Cited

U.S. PATENT DOCUMENTS

| | | | |
|---|---|---|---|
| 5,819,292 | A | 10/1998 | Hitz et al. |
| 5,963,962 | A | 10/1999 | Hitz et al. |
| 6,038,570 | A | 3/2000 | Hitz et al. |
| 6,728,897 | B1 | 4/2004 | Cramer et al. |
| 6,920,494 | B2 * | 7/2005 | Heitman et al. ............. 709/223 |
| 2003/0023705 | A1 * | 1/2003 | Kim ............................ 709/220 |
| 2003/0055932 | A1 * | 3/2003 | Brisse ........................ 709/223 |
| 2003/0149763 | A1 * | 8/2003 | Heitman et al. ............. 709/224 |
| 2003/0208589 | A1 * | 11/2003 | Yamamoto ................... 709/224 |
| 2004/0006612 | A1 * | 1/2004 | Jibbe et al. ................... 709/223 |

OTHER PUBLICATIONS

U.S. Appl. No. 10/215,917, filed Aug. 9, 2002, Pawlowski et al., entitled Multi-Protocol Storage Appliance That Provides Integrated Support for File and Block Access Protocols.
U.S. Appl. No. 10/395,405, filed Mar. 24, 2003, Prabhakar Krishnan, entitled System and Method for Automatically Diagnosing Protocol Errors From Packet Traces.
Fielding et al., (1999) Request for Comments (RFC) 2616, HTTP/1.1.
Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001.
David Hitz et al., TR3002 File System Design for a NFS File Server Appliance published by Network Appliance, Inc.

* cited by examiner

*Primary Examiner*—Yolanda L Wilson
(74) *Attorney, Agent, or Firm*—Cesari and McKenna LLP

(57) ABSTRACT

The system and method verifies a configuration of a storage system through versions, configurations and components failure of the various storage system components and generates a report identifying errors and/or warnings of the current configuration. A graphical representation of the storage system, including switches, clients and the like may be generated showing misconfiguration errors.

35 Claims, 5 Drawing Sheets

TECHNIQUE FOR VERIFYING A CONFIGURATION OF A STORAGE ENVIRONMENT

FIELD OF THE INVENTION

The present invention relates to configuring storage environments and, in particular, to verifying the configurations of storage environments including storage systems utilizing block access protocols.

BACKGROUND OF THE INVENTION

A storage system is a computer that provides storage service relating to the organization of information on writeable persistent storage devices, such as memories, tapes or disks. The storage system is commonly deployed within a storage environment, such as a storage area network (SAN) or a network attached storage (NAS) environment. As used herein, the term storage environment should be taken to include a SAN and/or NAS environment including storage systems, clients and/or other internetworking components, such as network switches, that are utilized by the clients and/or storage systems.

When used within a NAS environment, the storage system may be embodied as a file server including a storage operating system that implements a file system to logically organize the information as a hierarchical structure of directories and files on, e.g. the disks. Each "on-disk" file may be implemented as a set of data structures, e.g., disk blocks, configured to store information, such as the actual data for the file. A directory, on the other hand, may be implemented as a specially formatted file in which information about other files and directories are stored.

The file server, or filer, may be further configured to operate according to a client/server model of information delivery to thereby allow many client systems (clients) to access shared resources, such as files, stored on the filer. Sharing of files is a hallmark of a NAS system, which is enabled because of semantic level access to files and file systems. Storage of information on a NAS system is typically deployed over a computer network comprising a geographically distributed collection of interconnected communication links, such as Ethernet, that allow clients to remotely access the information (files) stored on the file server. The clients typically communicate with the filer by exchanging discrete frames or packets of data according to pre-defined protocols, such as the well-known Transmission Control Protocol/Internet Protocol (TCP/IP).

In the client/server model, the client may comprise an application executing on a computer that "connects" to the filer over a computer network, such as a point-to-point link, shared local area network, wide area network or virtual private network implemented over a public network, such as the well-known Internet. NAS systems generally utilize file-based access protocols; therefore, each client may request the services of the filer by issuing file system protocol messages (in the form of packets) to the file system over the network. By supporting a plurality of file system protocols, such as the conventional Common Internet File System (CIFS), the Network File System (NFS) and the Direct Access File System (DAFS) protocols, the utility of the filer may be enhanced for networking clients.

Conversely, a SAN is a high-speed network that enables establishment of direct connections between a storage system and its storage devices. The SAN may thus be viewed as an extension to a storage bus and, as such, a storage operating system of the storage system enables access to stored information using block-based access protocols over the "extended bus." In this context, the extended bus is typically embodied as Fibre Channel (FC) or Ethernet media adapted to operate with block access protocols, such as Small Computer Systems Interface (SCSI) protocol encapsulation over FC (FCP) or TCP/IP/Ethernet (iSCSI). A SAN arrangement or deployment allows decoupling of storage from the storage system, such as an application server, and some level of storage sharing at the application server level. There are, however, environments wherein a SAN is dedicated to a single server.

It is advantageous for the services and data provided by a storage system to be available for access to the greatest degree possible. Accordingly, some computer storage systems provide a plurality of storage systems in a cluster, with a property that when a first storage system fails, the second storage system is available to take over and provide the services and the data otherwise provided by the first storage system. When a first storage system fails, the second storage system in the cluster assumes the task of processing and handling any data access requests normally processed by the first storage system. One such example of a cluster configuration is described in U.S. patent application Ser. No. 09/625,234 entitled NEGOTIATING TAKEOVER IN HIGH AVAILABILITY CLUSTER by Samuel M. Cramer, et al.

In typical storage environment configurations, an administrator may have to configure multiple storage systems, switches, disk drive loops and/or clients to ensure proper storage environment connectivity. Changes to the configuration may have cascading effects throughout the storage environment, especially with redundant data paths. Typically, minor misconfigurations may cause logical unit numbers (lun) to not be exported by a storage appliance or be inaccessible to certain clients. In extreme cases, luns may be accessible via a primary data path, but in the event of a failover not be accessible via redundant data path. Such a misconfiguration may have serious performance and data integrity consequences if it is not discovered until after a failover situation occurs. Administrators typically perform site checks of basic cabling of SAN systems to ensure proper data connectivity; however, administrators may overlook certain incompatibilities with devices or components of a SAN storage system.

The possibility of misconfiguring a storage environment increases when new hardware and/or network topologies are added, e.g. implementing a storage system cluster for increased data availability. Alternatively, when a component, e.g. a storage system, is upgraded to include additional features, an administrator may accidentally create a configuration that is inappropriate or that has unexpected consequences. These misconfigurations may not be obvious until the SAN enters alternate configurations, such as a failover mode, because a loss of connectivity and/or data paths.

SUMMARY OF THE INVENTION

The present invention overcomes the disadvantages of the prior art by providing a technique for verifying a configuration of a storage environment. The system and method comprises, in the illustrative embodiment, a utility program, e.g., a configuration verification program, that may be executed on one or more clients of a storage system within the storage environment.

The configuration verification program (CVP) performs a three-phase configuration check of the storage environment. In the first phase, the CVP checks appropriate versions of the storage environment components, including firmware versions of storage systems, clients, and/or network switching devices within the storage system. This may be accomplished by, for example, logging into appropriate switches and requesting, using conventional remote management techniques and protocols, software and/or firmware revision or version values. Similarly, appropriate versions may be obtained from storage systems in the storage environment by using remote procedures calls or by logging into the storage systems.

In the second phase, the CVP checks various configuration settings of the storage environment components, including, for example whether failover modes are active for a storage system or whether switch zoning is active. During this phase, the CVP collects various configuration settings from the components of the storage system using techniques similar to those used for obtaining version values. The CVP examines the aggregated configuration information collected by the CVP to determine if there are any misconfigurations in the storage environment.

In the third phase, the CVP checks for component failures in the storage environment, e.g., by sending directed packets via all potential data paths to ensure that all of the components of the storage environment are operational.

Finally, the verification program presents a report to the user either via a command line interface (CLI) or via a graphical user interface (GUI). In the example of a CLI report, various command line options of a CLI command directed to executing the CVP may delineate certain parameters that limit the types of errors and/or warnings to be reported. When used within a GUI, the CVP may present a graphical representation of the current state of the storage environment to enable a user or administrator to more quickly appreciate certain misconfigurations or failures.

Advantageously, the novel CVP obviates the need for a user or administrator to laboriously check all possible misconfiguration scenarios. Similarly, by providing a detailed report to the administrator, faster repairs and proper configurations may be generated, thereby reducing the amount of time that the storage environment is at risk for data loss due to the misconfigurations.

BRIEF DESCRIPTION OF THE DRAWINGS

The above and further advantages of invention may be understood by referring to the following description in conjunction with the accompanying drawings in which like reference numerals indicate identical or functionally similar elements.

DETAILED DESCRIPTION OF ILLUSTRATIVE EMBODIMENTS

A. Storage Environment

Figure 1:
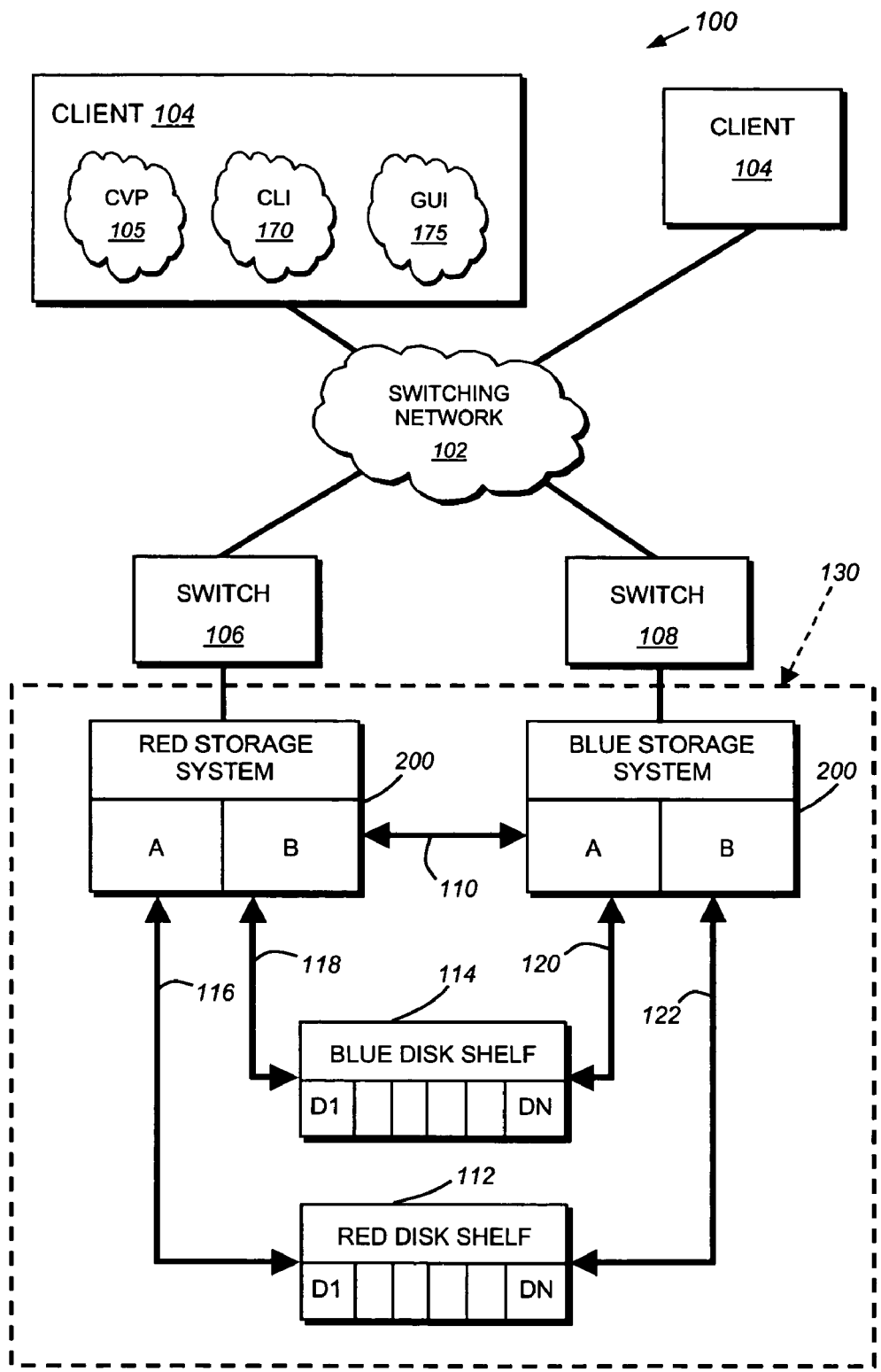
FIG. 1 is a schematic block diagram of an illustrative storage environment in accordance with an embodiment of the present invention.

FIG. 1 is a schematic block diagram of an exemplary storage environment 100 in which the principles of the present invention are implemented. The environment 100 is based around a switching network 102 configured as, e.g., a Fibre Channel (FC) based network. Attached to the network are a number of switches, 106 and 108, which connect to FC devices, such as Red storage system and Blue storage system 200. A number of clients 104 are also interconnected with the switching network 102. In alternate embodiments, the switching network 102 may be a local area network (LAN), wide area network (WAN), a virtual private network (VPN) or any other acceptable network arrangement, such as a fibre channel (FC) fabric.

A client 104 may be a general-purpose computer, such as a PC or a workstation, or a special-purpose computer, such as an application server, configured to execute applications over an operating system that includes block access protocols. A client may include a configuration verification program (CVP) 105 that implements the verification of the storage system in accordance with the present invention. The client 104 may also include a command line interface (CLI) 170 and/or a graphical user interface (GUI) 175 for implementing various applications, including, for example, the CVP 105. The CVP, described further below, performs a variety of verification routines to determine if there are misconfiguration or component failures in the storage environment 100.

Red storage system and Blue storage system 200 are connected as two nodes of an exemplary storage system cluster 130. These storage systems, described further below, are illustrative storage appliances configured to control storage of and access to, interconnected storage devices. Each of the devices attached to the network 102 includes an appropriate conventional network interface arrangement (not shown) for communicating over the network 102, or through the switches 106 and 108, using a set of desired block access protocols such as the Small Computer System Interface (SCSI) encapsulated in FC (FCP) or SCSI encapsulated in TCP/IP (iSCSI).

In the illustrated example, Red storage system 200 is connected to Red Disk Shelf 112 by data access loop 116. It should be noted that such a data access loop can be any acceptable networking media including, for example, a Fibre Channel Arbitrated Loop (FC-AL). Fibre Channel (FC) is a set of related protocols that define a transport service for a variety of data access protocols. Similarly, the Red storage system accesses Blue Disk Shelf 114 via counterpart data access loop 118. Likewise, Blue storage system accesses Blue Disk Shelf 114 via data access loop 120 and Red Disk Shelf 112 through data access loop 122. It should be noted that the Red and Blue disk shelves are shown directly connected to the storage systems 200 for illustrative purposes only. The disk shelves and storage systems may be operatively interconnected in any suitable network topology, including through switches or over a LAN.

During normal cluster operation, the storage system that is connected to a disk shelf via the disk shelf's A loop is the "owner" of the disk shelf and is primarily responsible for servicing data requests directed to blocks or volumes contained on that disk shelf. In accordance with an exemplary embodiment, only the storage system that owns a set of disks may write to that given set of disks. Thus, in this example, the Red storage system would own the Red Disk Shelf 112 (as it is connected to the Red Disk Shelf's A Loop) and be primarily responsible for servicing data access requests blocks contained on that disk shelf. Similarly, the Blue storage system is primarily responsible for the Blue Disk Shelf 114. When operating as a cluster, each storage system is adapted to take over and assume data handling capabilities for the other storage system in the storage system cluster 130.

Connecting the Red and Blue storage systems, in the illustrative embodiment, is a cluster interconnect 110, which provides a direct communication link between the two storage systems. The cluster interconnect may be of any suitable communication medium, including, for example, an Ethernet connection. In the illustrative embodiment, each of the storage system 200 of the storage system cluster 130 send to the other storage system a regularly timed "heartbeat" signal. The heartbeat signal alerts the other storage system that the transmitting storage system is operational and is not suffering from an error or other failure condition.

B. Storage Appliances

Figure 2:
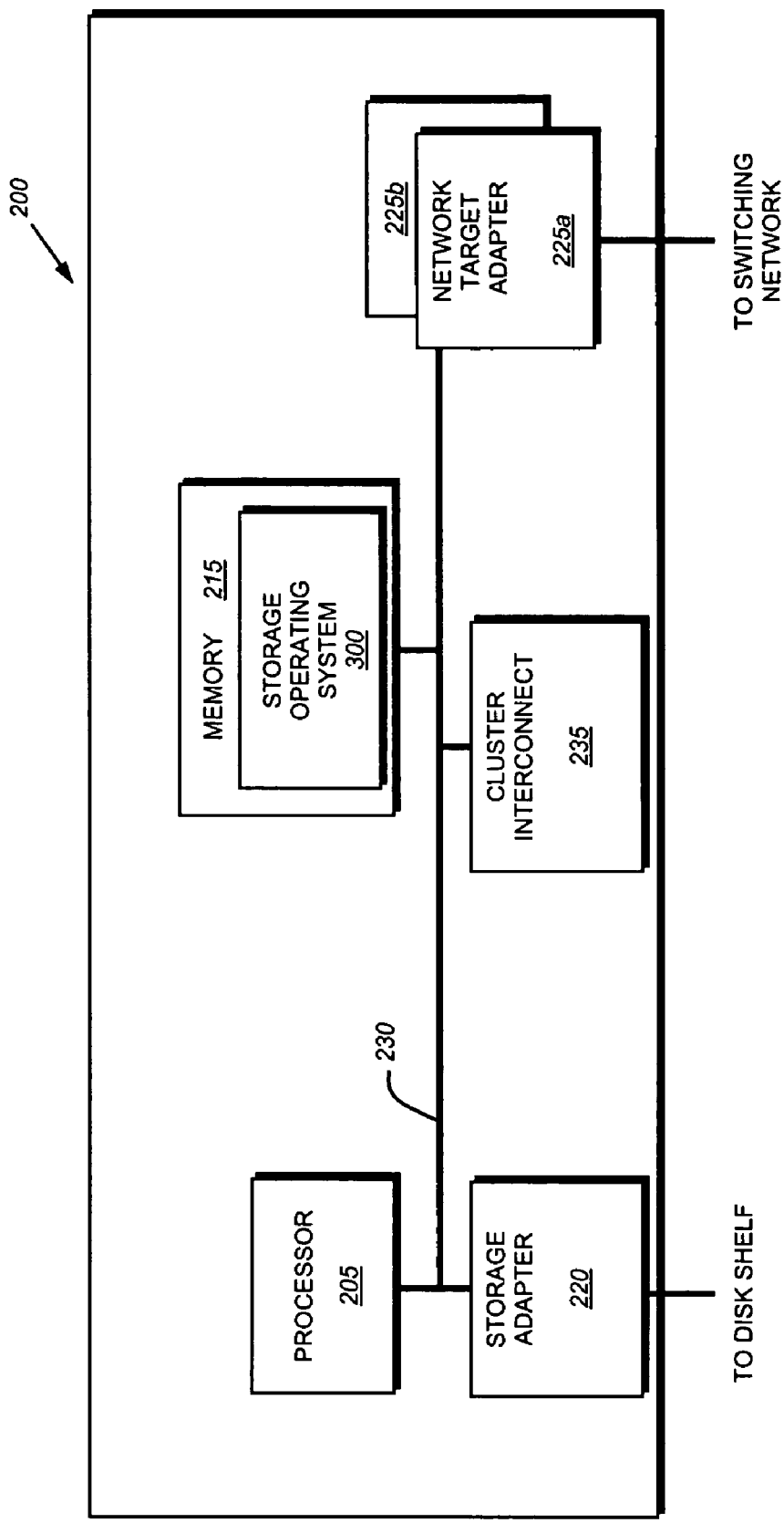
FIG. 2 is a more-detailed schematic block diagram of an exemplary storage appliance in accordance with FIG. 1.

FIG. 2 is a schematic block diagram of a storage system 200 as used in the exemplary storage environment 100 of FIG. 1 configured to provide storage service relating to the organization of information on storage devices, such as disks. As noted, the storage system 200 is illustratively embodied as a storage appliance. A storage appliance is a computer having features such as simplicity of storage service management and ease of storage reconfiguration, including reusable storage space, for users (system administrators) and clients of network attached storage (NAS) and storage area networks (SAN) deployments. The storage appliance may provide NAS services through a file system, while the same appliance provides SAN services through SAN virtualization, including logical unit number (lun) emulation. Storage appliances are further described in U.S. patent application Ser. No. 10/215,917, entitled MULTI-PROTOCOL STORAGE APPLIANCE THAT PROVIDES INTEGRATED SUPPORT FOR FILE AND BLOCK ACCESS PROTOCOLS, by Brian Pawlowski, et al. The terms "storage system" and "storage appliance" are herein used interchangeably. The storage appliance comprises a processor 205, a memory 215, a plurality of network adapters 225a, 225b and a storage adapter 220 interconnected by a system bus 230. The storage appliance 200 also includes a storage operating system 300 that provides a virtualization function to logically organize the information as a hierarchical structure of directory, file and virtual disk (vdisk) storage objects on the disks.

In the illustrative embodiment, the memory 215 comprises storage locations that are addressable by the processor and adapters for storing software program code and data structures associated with the present invention. The processor and adapters may, in turn, comprise processing elements and/or logic circuitry configured to execute the software code and manipulate the data structures. The storage operating system 300, portions of which are typically resident in memory and executed by the processing elements, functionally organizes the storage appliance by, inter alia, invoking storage operations in support of the storage service implemented by the appliance. It will be apparent to those skilled in the art that other processing and memory means, including various computer readable media, may be used for storing and executing program instructions pertaining to the inventive system and method described herein.

The network adapters 225a and 225b couple the storage appliance to a plurality of clients over point-to-point links, WANs, VPNs implemented over a public network (Internet) or a shared LAN or any other acceptable form of networking architecture such as switching network 102. Therefore, the network adapter 225a and 225b may comprise a network interface card (NIC) having the mechanical, electrical and signaling circuitry needed to connect the storage appliance to a network switch, such as a conventional Ethernet switch. Alternately, the network adapter 225 may comprise FC Host Bus Adapter (HBA). An HBA is a hardware device that operates at the SCSI level by passing SCSI requests to a software driver. The HBA also performs data transfers to and from a set of buffers provided by the driver.

The clients may be general-purpose computers configured to execute applications over a variety of operating systems, including the UNIX® and Microsoft® Windows™ operating systems. These clients 104 are configured to access the information stored on the appliance 200 as blocks. The clients generally utilize block-based access protocols, such as the SCSI protocol, when accessing information (in the form of blocks, disks or vdisks) over a SAN-based network. SCSI is a peripheral input/output (I/O) interface with a standard, device independent protocol that allows different peripheral devices, such as disks, to attach to the storage appliance 200. In SCSI terminology, clients 104 operating in a SAN environment are initiators that initiate requests and commands for data. The multi-protocol storage appliance is thus a target configured to respond to the requests issued by the initiators in accordance with a request/response protocol. When the underlying transport protocol is TCP/IP, clients may encapsulate SCSI protocol commands over the transport protocol to generate iSCSI commands. The iSCSI protocol is further defined in *Internet Draft: iSCSI*, Aug. 5, 2002, by Julian Satran, et al.

The storage appliance 200 supports various SCSI-based protocols used in SAN deployments, including iSCSI and SCSI encapsulated over Fibre Channel (FCP). The initiators (hereinafter clients 104) may thus request the services of the target (hereinafter storage appliance 200) by issuing iSCSI and/or FCP messages over the network 102 to access information stored on the disks. It will be apparent to those skilled in the art that the clients may also request the services of the storage appliance using other block access protocols. By supporting a plurality of block access protocols, the storage appliance provides a unified and coherent access solution to vdisks/luns in a heterogeneous SAN environment.

The storage adapter 220 cooperates with the storage operating system 300 executing on the storage appliance to access information requested by the clients. The information may be stored on the disks or other similar media adapted to store information. The storage adapter includes input/output (I/O) interface circuitry that couples to the disks over an I/O interconnect arrangement, such as a conventional high-performance, Fibre Channel serial link or loop topology. The information is retrieved by the storage adapter and, if necessary, processed by the processor 205 (or the adapter 220 itself) prior to being forwarded over the system bus 230 to the network adapters 225a and 225b, where the information is formatted into appropriate packets or messages for return to the clients.

Storage of information on the multi-protocol storage appliance 200 is, in the illustrative embodiment, implemented as one or more storage volumes that comprise a cluster of physical storage disks, defining an overall logical arrangement of disk space. The disks within a volume are typically organized as one or more groups of Redundant Array of Independent (or Inexpensive) Disks (RAID). RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails.

Specifically, each volume is constructed from an array of physical disks that are organized as RAID groups. The physical disks of each RAID group include those disks configured to store striped data and those configured to store parity for the data, in accordance with an illustrative RAID 4 level configuration. However, other RAID-level configurations (e.g. RAID 5) are also contemplated. In the illustrative embodiment, a minimum of one parity disk and one data disk may be employed. Yet, a typical implementation may include three data and one parity disk per RAID group and at least one RAID group per volume.

To facilitate access to the disks, the storage operating system 300 implements a write-anywhere file system that cooperates with novel virtualization system code to provide a function that "virtualizes" the storage space provided by disks. The file system logically organizes the information as a hierarchical structure of directory and file objects (hereinafter "directories" and "files") on the disks. Each "on-disk" file may be implemented as set of disk blocks configured to store information, such as data, whereas the directory may be implemented as a specially formatted file in which names and links to other files and directories are stored. The virtualization function allows the file system to further logically organize information as vdisks on the disks, thereby providing an integrated NAS and SAN storage appliance approach to storage by enabling file-based (NAS) access to the files and directories, while further emulating block-based (SAN) access to the vdisks on a file-based storage platform.

As noted, a vdisk is a special file type in a volume that derives from a plain (regular) file, but that has associated export controls and operation restrictions that support emulation of a disk. Unlike a file that can be created by a client using, e.g., the NFS or CIFS protocol, a vdisk is created on the storage appliance via, e.g., a user interface (UI) as a special typed file (object). Illustratively, the vdisk is a multi-inode object comprising a special file inode that holds data and at least one associated stream inode that holds attributes, including security information. The special file inode functions as a main container for storing data associated with the emulated disk. The stream inode stores attributes that allow luns and exports to persist over, e.g., reboot operations, while also enabling management of the vdisk as a single disk object in relation to SAN clients.

C. Storage Operating System

In the illustrative embodiment, the storage operating system executing on the storage appliances is the NetApp® Data ONTAP™ operating system available from Network Appliance, Inc. of Sunnyvale, Calif., that implements a Write Anywhere File Layout (WAFL™) file system. However, it is expressly contemplated that any appropriate storage operating system, including a write in-place file system, may be enhanced for use in accordance with the inventive principles described herein. As such, where the term "WAFL" is employed, it should be taken broadly to refer to any storage operating system that is otherwise adaptable to the teachings of this invention.

As used herein, the term "storage operating system" generally refers to the computer-executable code operable on a computer that manages data access and may, in the case of a storage appliance, implement data access semantics, such as the Data ONTAP storage operating system, which is implemented as a microkernel. The storage operating system can also be implemented as an application program operating over a general-purpose operating system, such as UNIX® or Windows NT®, or as a general-purpose operating system with configurable functionality, which is configured for storage applications as described herein.

In addition, it will be understood to those skilled in the art that the inventive technique described herein may apply to any type of special-purpose (e.g., storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 3:
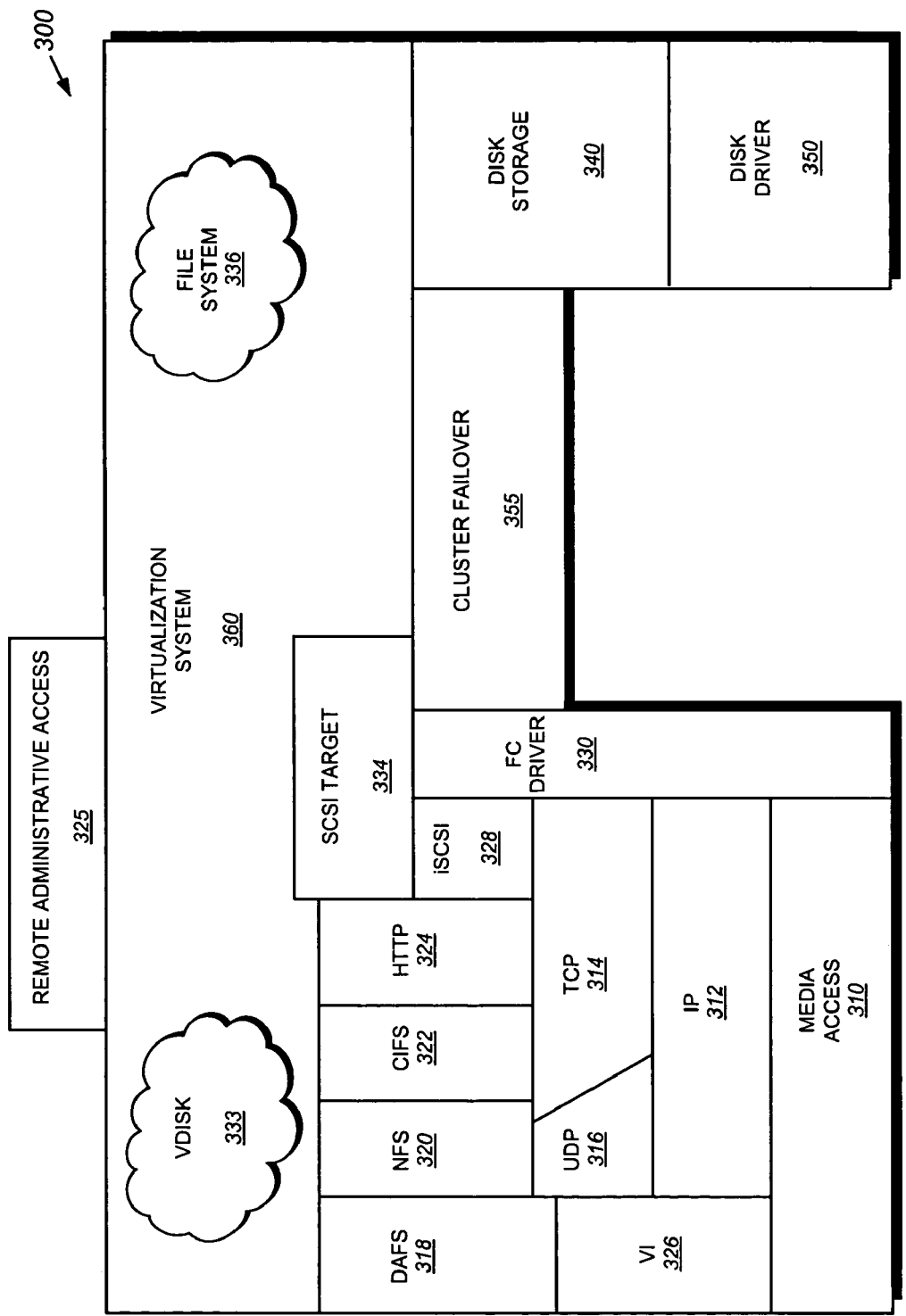
FIG. 3 is a schematic block diagram of an exemplary storage operating system for use with the exemplary storage appliance of FIG. 2 in accordance to an exemplary embodiment of the present invention.

FIG. 3 is a schematic block diagram of an exemplary storage operating system 300 that may be advantageously used with the present invention. The storage operating system comprises a series of software layers organized to form an integrated network protocol stack or multi-protocol engine that provides data paths for clients to access information stored on the multi-protocol storage appliance using block and file access protocols. The protocol stack includes a media access layer 310 of network drivers (e.g., gigabit Ethernet drivers) that interfaces to network protocol layers, such as the Internet Protocol (IP) layer 312 and its supporting transport mechanisms, the Transport Control Protocol (TCP) layer 314 and the User Datagram Protocol (UDP) layer 316. A file system protocol layer provides multi-protocol file access and, to that end, includes support for the Direct Access File System (DAFS) protocol 318, the Network File System (NFS) protocol 320, the Common Internet File System (CIFS) protocol 322 and the Hypertext Transfer Protocol (HTTP) protocol 324. A Virtual Interface (VI) layer 326 implements the VI architecture to provide direct access transport (DAT) capabilities, such as Remote Direct Memory Access (RDMA), as required by the DAFS protocol 318.

An iSCSI driver layer 328 provides block protocol access over the TCP/IP network protocol layers by interacting with an iSCSI HBA 331. Similarly, a Fibre Channel (FC) driver layer 330 operates with an FC HBA to receive and transmit block access requests and responses to and from the integrated storage appliance. The FC and iSCSI drivers provide FC-specific and iSCSI-specific access control to the luns (vdisks) and, thus, manage exports of vdisks to either iSCSI or FCP or, alternatively, to both iSCSI and FCP when accessing a single vdisk on the multi-protocol storage appliance. In addition, the storage operating system includes a disk storage layer 340 that implements a disk storage protocol, such as a RAID protocol, and a disk driver layer 350 that implements a disk access protocol such as, e.g., a SCSI protocol.

Bridging the disk software layers with the integrated network protocol stack layers is a virtualization system 360 that is implemented by a file system 336 interacting with virtualization software embodied as, e.g., vdisk module 333 and SCSI target module 334. It should be noted that such modules may be implemented in software, hardware, firmware or a combination thereof. The vdisk module 333 manages SAN deployments by, among other things, implementing a comprehensive set of vdisk (lun) commands that are converted to primitive file system operations ("primitives") that interact with the file system 336 and the SCSI target module 334 to implement the vdisks.

The SCSI target module 334, in turn, initiates emulation of a disk or lun by providing a mapping procedure that translates luns into the special vdisk file types. The SCSI target module is illustratively disposed between the FC and iSCSI drivers 328, 330 and the file system 336 to thereby provide a translation layer of the virtualization system 360 between the SAN block (lun) space and the file system space, where luns are represented as vdisks.

The file system 336 illustratively implements a Write Anywhere File Layout (WAFL) file system having an on-disk format representation that is block-based using, e.g., 4 kilobyte (kB) blocks and using inodes to describe the files. A further description of the structure of the file system, is provided in U.S. Pat. No. 5,819,292, titled Method for Maintaining Consistent States of a File System and for Creating User-Accessible Read-Only Copies of a File System by David Hitz et al., issued Oct. 6, 1998, which patent is hereby incorporated by reference as though fully set forth herein.

The storage operating system 300 further includes a cluster failover layer 355 that implements various failover features including initiating a failover. The cluster failover layer 355 monitors the cluster interconnect for heartbeat signals to determine if a cluster "partner' is still active or if an error condition has occurred.

Also included within the storage operating system 300 is a remote administrative access module 325 that provides, for example, remote application program interfaces (RAPIs) for processes executing on remote computers to perform management routines on the storage appliance. These RAPIs may include functions for obtaining various performance and/or configuration data, such as a Get_Software_Version( ) function that returns various version information concerning the storage operating system. Alternatively, the remote administrative access module 325 may provide support for an administrator to log into the storage appliance using, e.g., the conventional telnet protocol, for management and data collection purposes.

D. Verifying the Configuration of a Storage System

Configuration of a storage environment, including, for example, a plurality of storage appliances, clients and/or interconnecting switches or other networking devices is generally complex. Administrators and/or users may easily misconfigure one or more components, especially in a clustering configuration where there are redundant data paths that need to be properly configured and maintained. The present invention is directed to a technique for verifying that the configuration of a storage environment is correct. In accordance an illustrative embodiment of with the present invention, a configuration verification program (CVP) is executed on one or more of the clients of the storage environment. The CVP illustratively performs a three phase check of the current configuration of the storage environment and presents a report to an administrator. The CVP may be executed on a client of the storage environment located at a user's facility or at a remote location, such as a facility associated with a manufacturer of a storage appliance. This permits remote configuration verification of a storage environment for technical support and/or customer service purposes.

Figure 4:
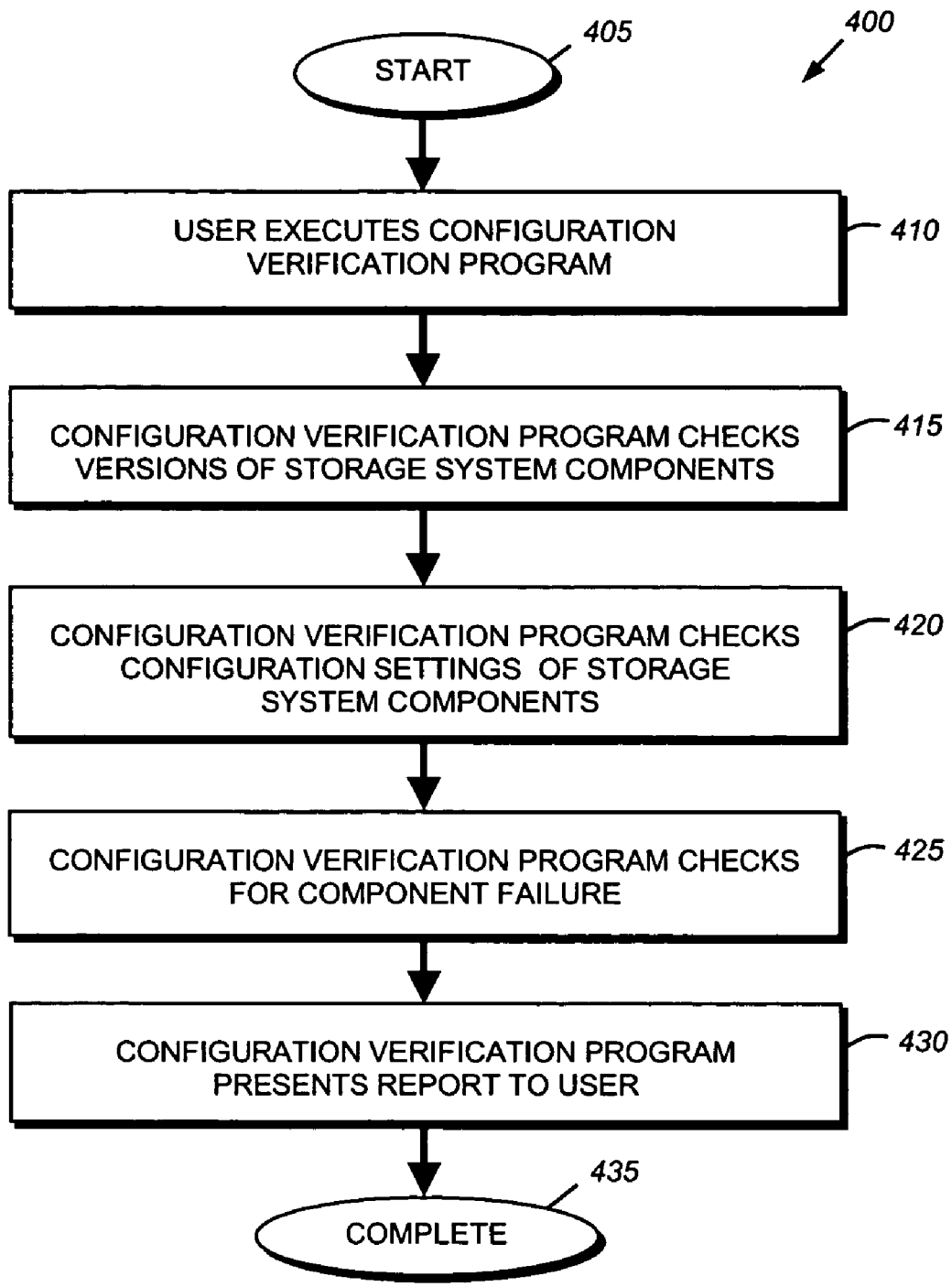
FIG. 4 is a flowchart detailing the steps of a procedure for verifying the configuration of a storage environment in accordance with an embodiment of the present invention.

FIG. 4 is a flowchart detailing the steps of a procedure 400 for verifying the configuration of a storage system in accordance with an illustrative embodiment of the present invention. The procedure begins in step 405 and continues to step 410 where the user executes the CVP illustratively as an application program on one or more of the clients of the storage system. The program may be initiated by a command entered on a command line interface (CLI) of the client or, alternatively, by selecting appropriate options within a graphical user interface (GUI) of the client. Once activated, the CVP communicates with the appropriate storage appliances, switches, clients and/or other components within the storage environment to perform a thorough check of the storage environment's configuration.

In step 415 the CVP checks the current versions of the various storage environment components. This version check is to ensure that the software, hardware and/or firmware versions of the various components are compatible. For example, the storage appliance may be executing a version of a storage operating system that lacks a particular functionality that is required by the other storage appliances within a storage environment according to the current configuration. Alternately, a switch may be executing an out-of-date version of its firmware that lacks appropriate functionality required by clients and/or storage appliances in the storage environment. The CVP may obtain appropriate version information by remotely logging into the various components. Alternately, the CVP may utilize a conventional remote application program interface (RAPI) to issue remote function calls to components to obtain the version information. As will be appreciated by one skilled in the art, numerous alternative techniques for remotely acquiring version information may be utilized by the CVP. Incompatible versions of components are noted to be later reported to the user. In the illustrative embodiment, the CVP is programmed with a list of incompatible versions. In alternate embodiments, the CVP may utilize an external datafile or database that may be updated from time to time to permit the CVP to continue to verify configurations after new components (or versions of components) are introduced.

Then, in step 420, the CVP checks the configuration settings of the various storage environment components to ensure that the components are configured properly and in an acceptable manner. For example, if one storage appliance in a cluster is configured to initiate a failover operation to the partner storage appliance, but the partner is not configured to accept the failover operation, a misconfiguration results. The current configuration settings are obtained using similar techniques as used to acquire version information. This check may also include connectivity. For example, the CVP check that cables are properly connected so that components are interconnected. This ensures that an administrator did not incorrectly configure the storage environment.

In step 425, the CVP checks for component failures. This step ensures that the various components of the storage environment have not failed with particular emphasis on redundant data pathways that may not be obvious in their failure. For example, an alternate data path may have failed with no obvious or visible effects until the time a failover situation occurs. At such a time, the redundant data path may not be operational and therefore result in a complete loss of data connectivity.

In step 430, the CVP presents a report to the user that includes, inter alia, improper versions, misconfigurations, failed components and/or other data gathered during the three phase check that may indicate a misconfiguration or violation of a "best practice" for storage environment configuration. This may comprise output from the CLI to a terminal or, in alternate embodiments, result in a graphical display on the GUI showing the results of the CVP. The CVP illustratively reports both errors and warnings. An error is a configuration that is incorrect and results in the potential for data loss. An example of an error is utilizing a storage appliance in a cluster that is executing a version of a storage operating system that does not support cluster operations. Conversely, a warning is a configuration that may not lead to data loss, but is against a predetermined set of "best practices." Examples of a warning may be that the two storage appliances in a cluster are running different versions of the storage operating system. It should be noted that in alternate embodiments, the results of each individual check or verification of steps 415 through 430 may be displayed as they are complete. However, it is also contemplated that a report will only be generated at the conclusion of all of the configuration checks.

In alternative embodiments, the report may be integrated into an expert system to automatically correct error or warning conditions. Such an automated expert is further described in U.S. patent application Ser. No. 10/395,405, entitled SYSTEM AND METHOD FOR AUTOMATICALLY DIAGNOSING PROTOCOL ERRORS FROM PACKET TRACES, by Prabhakar Krishnan. Alternatively, the expert system may remotely trigger error/warning alerts for an administrator or may automatically contact an administrator to warn of the error in the configuration. Once the verification program has presented its report the procedure is complete in step 440.

An exemplary CLI invocation of the CVP is:

cvp [-q] [-e] [-f] [-o]

wherein the -q option indicates that the command should run in a quiet mode where a return code is the only output of the command. For example, a return code of zero means that there are no errors and/or warnings; a return code of one means that there are warnings and a return code two means that there are errors and/or possibly warnings. This permits the CVP command to be utilized in conventional shell scripts or the like to automate storage environment management. The -e option causes the CVP to only report errors and not warnings.

The -f option identifies a file that contains a list of components that should be verified. This file contains entries, illustratively in the format of:

<type> <nodename> <access_method> [user:password]

wherein <type> identifies a type of component, e.g., a switch or a storage appliance, <nodename> identifies the name of the component and <access_method> defines how the CVP should access the component. Examples of <access_method> may include RSH, API or TELNET, identifying the conventional remote shell protocol, a remote application program interface and the telnet protocol, respectively. The optional user:password entry identifies a username and password for the CVP to gain access to the component in order to acquire the necessary data to perform the verification.

The -o option to the CVP command indicates an output file, i.e. -o filename.jpg, where the CVP program should render a graphical representation of the current configuration of the storage environment. Such output file may be, for example, in the conventional JPEG format. However, it is expressly contemplated that other file formats may be utilized in alternate embodiments. The output file, described further below, graphically presents the current configuration of the storage environment.

Figure 5:
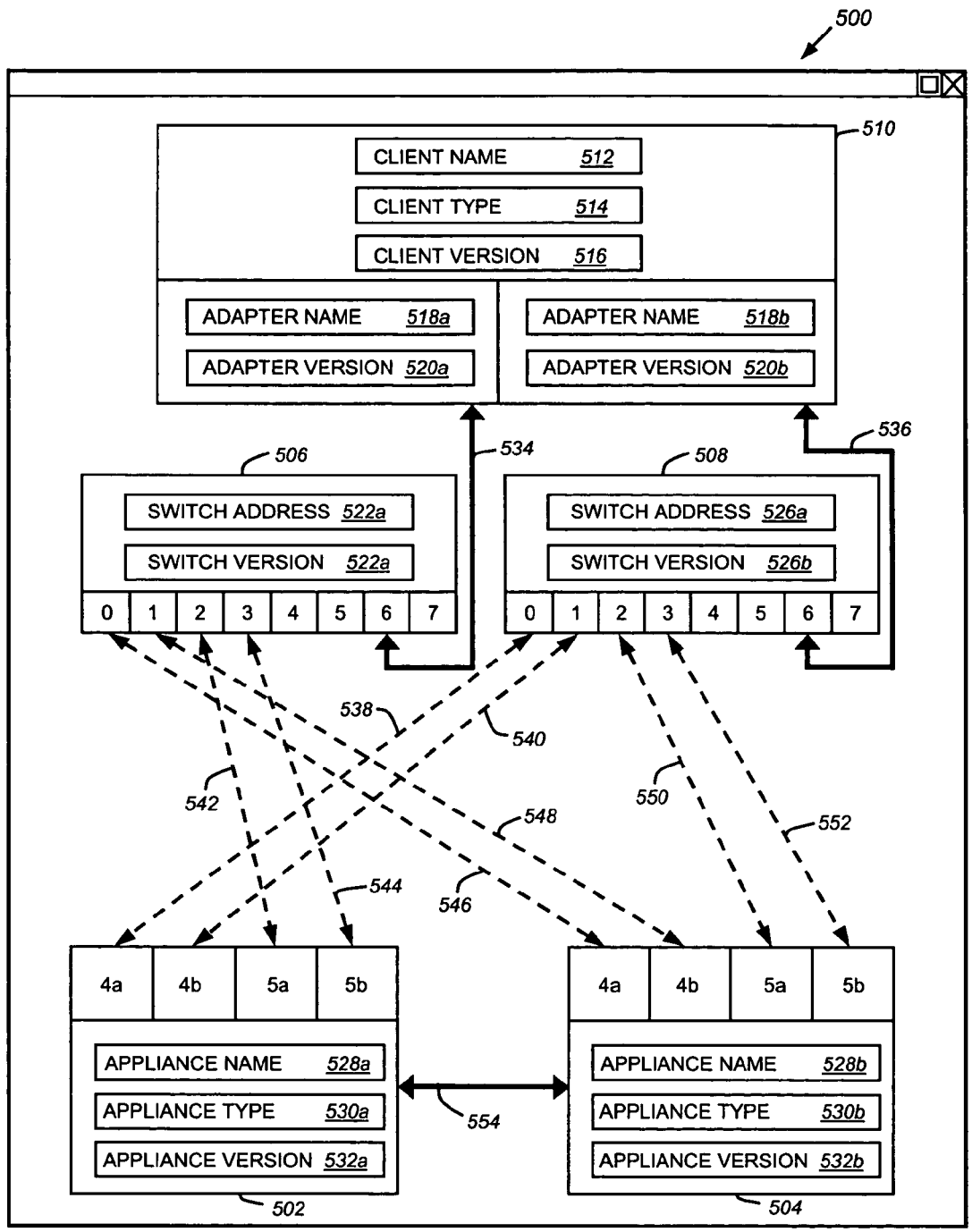
FIG. 5 is a schematic block diagram or graphical user interface window showing an illustrative representation of a storage environment in accordance with an embodiment of the present invention.

FIG. 5 shows an exemplary graphical user interface (GUI) window 500 showing a report from the CVP in accordance with an illustrative embodiment of the present invention. The window 500 includes a graphical representation of the storage environment and associated components as determined by the CVP. This graphical representation may also be generated into a graphic file by, for example, the use of the no option to the CVP command, as described above.

The GUI window 500 includes illustrative representations of a first and second storage appliance 502 and 504, two switches 506 and 508 and a client 510. The representation of a client 510 includes the client name field 512, a client type field 514 and a client version field 516. The client name field 512 represents the name of the identified client, for example, a host name or other identifying names associated with the particular client. The client type 514 field identifies the type of system that the client comprises. For example, this may contain a text string identifying the client as a Sun Microsystems's Sun Fire 880 machine. The client version field 516 identifies a particular version of the operating system or storage subsystem of the client. For example, if the client type field 514 is "sun fire 880" the client version field 516 may identify the version of the Sun Operating System that is executing on the client. Alternately, if a client utilizes a separate storage subsystem, the client version field 516 may identify the software version associated with that subsystem.

Also included within the client representation 510 are adapter name fields 518a, b and adapter versions fields 520a, b. The adapter name field 518 contains the name of the type of adapter associated with the client, for example, a World Wide Node Name (WWNN) of a host bus adapter (HBA) connected to the client. The adapter version field 520 identifies the software, hardware and/or firmware version of the particular adapter.

The switch representations 506 and 508 contain a switch address field 522a, b and a switch version field 524a, b. The switch address field 522 contains the appropriate network address of the switch. For example, in an iSCSI network, the switch address may comprise a TCP/IP protocol address. In a FC environment, the switch address field 522 may comprise a WWNN associated with the switch. Also included in a switch representation 506 and 508 are numbered port entries (0-7) identifying each of the ports associated with the switch. In the illustrative example of FIG. 5, each switch has eight ports numbered 0-7. It should be noted that in alternate embodiments, switches may have varying numbers of ports and/or different numbering schemas. The switch version field 524a, b contains version information related to the switch's software, hardware and/or firmware version.

The storage appliance representations 502 and 504 include representations for various ports 4a, 4b, 5a, 5b on HBA adapters associated with the storage appliance. Also included within the storage appliance representations 502, 504 are an appliance name field 528, appliance type field 530 and appliance version field 532. The appliance name field 528 identifies the name of the particular storage appliance. The appliance type field 530 identifies the type of storage appliance, for example a Network Appliance F900-series storage appliance. The appliance version field 532 verifies a version of the storage operating system executing on the storage appliance. For example, a Network Appliance F900 series storage appliance may be executing the Network Appliance Data ON TAP storage operating system version 6.4.2.

In the illustrative embodiment, the various fields and/or representations of the GUI window 500 may be color-coded to identify potential misconfigurations. For example, warning situations may be denoted by having the appropriate fields and/or connections labeled in yellow. Similarly, errors may be identified by marking the appropriate fields and/or connections in red. Each of the connections (data) may also be color-coded to alert a user that a cable has failed.

To again summarize, the present invention implements a technique for verifying a configuration of a storage system comprising one or more interconnected storage appliances, switches and/or components. In the illustrative embodiment a CVP is executed on one or more of the clients of the storage system to perform a real-time verification on the configuration of the various components of the storage system. The CVP checks, in three phases, the current configuration of the storage to ensure that it is properly configured and following the best practices of a particular storage appliance manufacturer. In the first phase, the various components of storage system, including, for example, switches, appliance and/or storage appliances, are verified for the appropriate version of software that they are operating. In a second phase, the configuration parameters of the components are checked to ensure that there are no misconfigurations. In the third phase, a check is performed to determine if there are any component failures. The results may be displayed either via a CLI or GUI of the client. When displayed in a GUI, the display may show a graphical depiction of the configuration of the storage environment that may be, in alternate embodiments, color-coded to identify warnings and/or errors in the configuration.

The foregoing description has been directed to specific embodiments of this invention. It will be apparent, however, that other variations and modifications may be made to the described embodiments, with the attainment of some or all of their advantages. Specifically, it should be noted that the configuration verification may occur in a different order or in a different number of phases. As such, the three-phase embodiment should be taken as exemplary only. Additionally, the procedures or processes may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A method for operating a data storage network, comprising:
    executing a configuration verification computer program;
    checking, by the configuration verification computer program, versions of a selected component of a plurality of components installed in the data storage network;
    checking, by the configuration verification computer program, configuration settings of the selected component of the plurality of components of the data storage network;
    determining, in response to the configuration settings, if there are any misconfiguration settings; and
    sending, in response to determining that there are no misconfiguration settings, a directed packet through a potential data path to ensure that a component of the storage network is operational.

2. The method as in claim 1, further comprising:
    presenting, in response to determining that there are misconfiguration settings, a report to a user identifying a set of warnings and errors with the configuration settings.

3. The method of claim 2 further comprising:
    including a return code in the report.

4. The method of claim 2, further comprising:
    presenting in the report a graphical representation of a configuration of an environment of the storage network.

5. The method of claim 4, further comprising:
    presenting in the graphical representation a version and current configuration of each component of the storage environment.

6. The method of claim 2 further comprising:
    correcting automatically any of the set of warnings and errors.

7. The method of claim 2 further comprising:
    passing the set of warnings and errors to an expert system.

8. The method of claim 1, further comprising:
    entering a command by a user to execute the configuration verification computer program.

9. The method of claim 1, further comprising:
    initiating the configuration verification program by an administrator.

10. The method of claim 1, further comprising:
    configuring one or more storage systems as a component of the plurality of components.

11. The method of claim 1, further comprising:
    configuring one or more clients as a component of the plurality of components.

12. The method of claim 1, further comprising:
    configuring one or more network switches as a component of the plurality of components.

13. The method of claim 1, further comprising:
    configuring one or more interconnecting cables as a component of the plurality of components.

14. The method of claim 1, further comprising:
    accessing each of a storage system of the data storage network by the configuration verification program to determine a version of a storage operating system executing on the storage system.

15. The method of claim 14 further comprising:
    sending a remote application program interface command to the storage system to access the storage system.

16. The method of claim 14 further comprising:
    repeating selecting the selected component until all components of the data storage network are checked by the configuration verification computer program.

17. A data storage computer network, comprising: a memory storing a configuration verification computer program; said configuration verification computer program executed by a processor;
    the configuration verification computer program to check versions of a selected component of a plurality of components installed in the data storage computer network;
    the configuration verification computer program to check configuration settings of the selected component of the plurality of components of the data storage computer network;
    the processor to determine, in response to the configuration settings, if there are any misconfiguration settings; and
    a port to send, in response to determining that there are no misconfiguration settings, a directed packet through a potential data path to ensure that a component of the storage system is operational.

18. The data storage network as in claim 17, further comprising:
    a report to present, in response to determining that there are misconfiguration settings, to a user identifying a set of warnings and errors with the configuration settings.

19. The data storage network of claim 18 further comprising:
    a return code included in the report.

20. The data storage network of claim 18, further comprising:
    the report presenting a graphical representation of a configuration of an environment of the storage network.

21. The data storage network of claim 20, further comprising:

the graphical representation presenting a version and current configuration of each component of the storage environment.

22. The data storage network of claim 18 further comprising:
a processor to correct automatically any of the set of warnings and errors.

23. The data storage network of claim 18 further comprising:
a processor to pass the set of warnings and errors to an expert system.

24. The data storage network of claim 17, further comprising:
a command entered by a user to execute the configuration verification computer program.

25. The data storage network of claim 17, further comprising:
a command for an administrator to initiate the configuration verification program.

26. The data storage network of claim 17, further comprising:
one or more storage systems configured as a component of the plurality of components.

27. The data storage network of claim 17, further comprising:
one or more clients configured as a component of the plurality of components.

28. The data storage network of claim 17, further comprising:
one or more network switches configured as a component of the plurality of components.

29. The data storage network of claim 17, further comprising:
one or more interconnecting cables configured as a component of the plurality of components.

30. The data storage network of claim 17, further comprising:
a command to access each of a storage system of the data storage network by the configuration verification program to determine a version of a storage operating system executing on the storage system.

31. The data storage network of claim 30 further comprising:
a remote application program interface command sent as the command to the storage system to access the storage system.

32. The data storage network of claim 17 further comprising:
a processor to repeatedly select the selected component until all components of the data storage network are checked by configuration verification computer program.

33. A computer readable media, comprising:
said computer readable media containing instructions for execution on a processor for a method of operating a data storage network, the method having the steps of:
executing a configuration verification computer program;
checking, by the configuration verification computer program, versions of a selected component of a plurality of components installed in the data storage network;
checking, by the configuration verification computer program, configuration settings of the selected component of the plurality of components of the data storage network;
determining, in response to the configuration settings, if there are any misconfiguration settings; and
sending, in response to determining that there are no misconfiguration settings, a directed packet through a potential data path to ensure that a component of the storage network is operational.

34. A computer, comprising: a memory storing a configuration verification computer program;
the configuration verification computer program to check versions of a selected component of a plurality of components installed in the data storage computer network;
the configuration verification computer program to check configuration settings of the selected component of the plurality of components of the data storage computer network;
a processor to determine, in response to the configuration settings, if there are any misconfiguration settings; and
a port to send, in response to determining that there are no misconfiguration settings, a directed packet through a potential data path to ensure that a component of the storage system is operational.

35. A computer readable media containing instructions for execution on a processor, said instructions comprising:
executing a configuration verification computer program;
checking, by the configuration verification computer program, versions of a selected component of a plurality of components installed in the data storage network;
checking, by the configuration verification computer program, configuration settings of the selected component of the plurality of components of the data storage network;
determining, in response to the configuration settings, if there are any misconfiguration settings; and
sending, in response to determining that there are no misconfiguration settings, a directed packet through a potential data path to ensure that a component of the storage network is operational.

* * * * *

UNITED STATES PATENT AND TRADEMARK OFFICE
CERTIFICATE OF CORRECTION

PATENT NO. : 7,487,381 B1  Page 1 of 1
APPLICATION NO. : 10/753707
DATED : February 3, 2009
INVENTOR(S) : Rebecca Beaman et al.

It is certified that error appears in the above-identified patent and that said Letters Patent is hereby corrected as shown below:

Col. 12, Line 3, please amend as shown:
     into a graphic file by, for example, the use of the ~~no~~ –o option to Signed and Sealed this First Day of December, 2009

David J. Kappos
*Director of the United States Patent and Trademark Office*